Patented Jan. 13, 1953

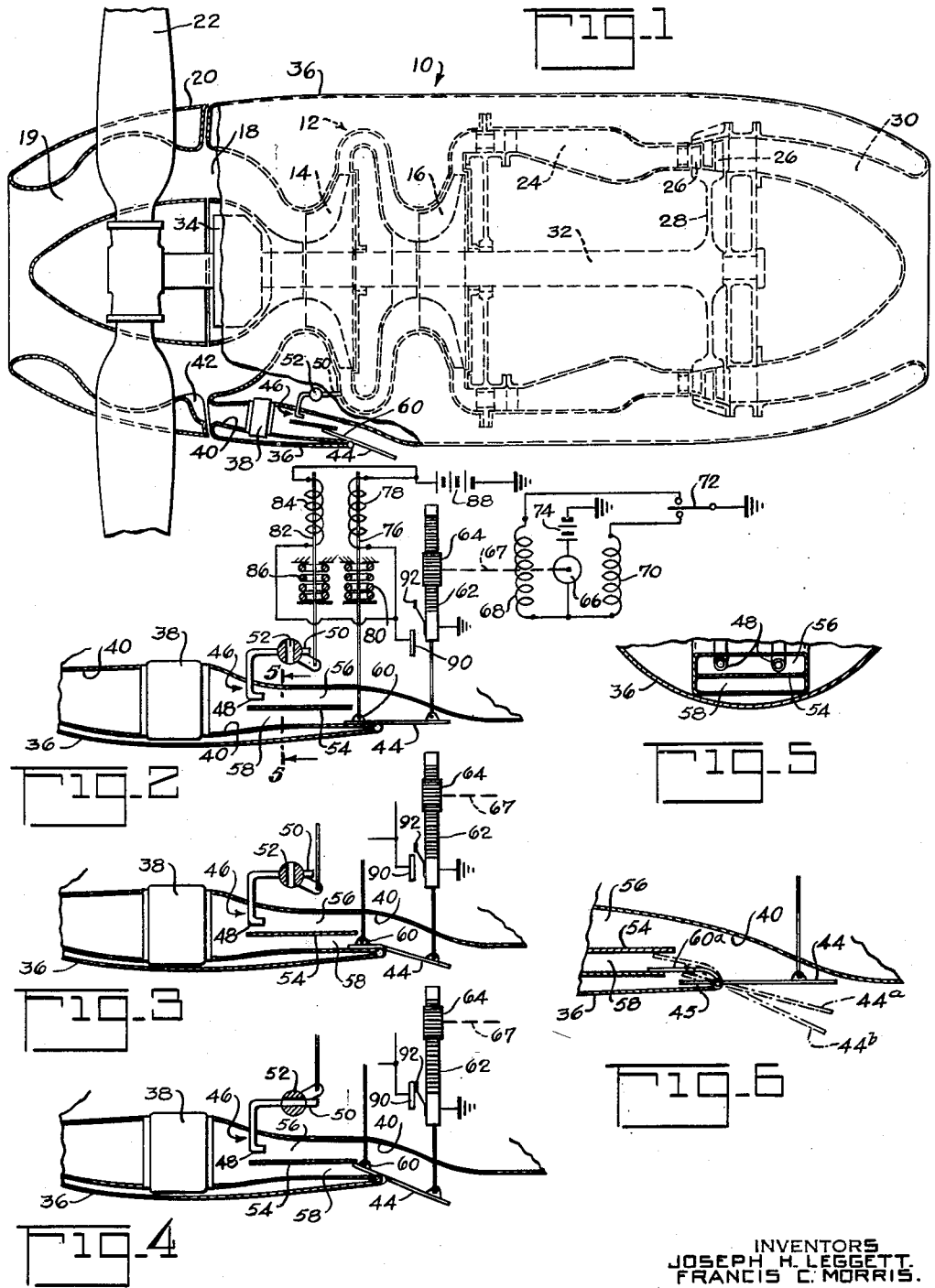

2,625,009

UNITED STATES PATENT OFFICE 2,625,009

VEHICLE ENGINE COOLING SYSTEM UTILIZING AIR EJECTOR PUMP TO INDUCE FLOW OF ADDITIONAL COOLING AIR

Joseph H. Leggett, Montclair, and Francis C. Morris, Fairlawn, N. J., assignors to Curtiss-Wright Corporation, a corporation of Delaware Application July 15, 1948, Serial No. 38,924

10 Claims. (Cl. 60—39.07)

1

This invention relates to an air cooling system for cooling a fluid associated with aircraft operation and is particularly directed to an arrangement for cooling the lubricating oil of an aircraft engine.

In aircraft engine lubrication systems, lubricating oil is circulated through an oil cooler or radiator over which cooling air flows for cooling said oil. During ground operation of the aircraft it is difficult to obtain sufficient air flow over the oil cooler. An object of this invention comprises the provision of a novel arrangement for assisting or augmenting the air flow over the oil cooler during ground operation of its aircraft engine.

The invention is particularly directed to an aircraft engine in which a compressor is driven by the engine for supplying the engine with compressed air for combustion. In accordance with the present invention air is bled off from said compressor, preferably at an intermediate stage of its compression, and said compressed air is used as an ejector pump for drawing cooling air over an oil cooler during ground operation of its associated aircraft engine.

Other objects of the invention will become apparent upon reading the annexed detailed description in connection with the drawing in which:

Figure 1 is a diagrammatic view of a gas turbine power plant having oil cooling arrangement embodying the invention;

Figure 2 is an enlarged sectional view of the oil cooling arrangement of Figure 1 and illustrating control mechanism therefor;

Figures 3 and 4 are views similar to Figure 2 but with the air flow regulating means in different positions from that illustrated in Figure 2;

Figure 5 is a sectional view taken along line 5—5 of Figure 2; and

Figure 6 is a partial sectional view of a modified construction.

Referring to the drawing, reference numeral 10 designates a gas turbine power plant for aircraft. As schematically illustrated in the drawing, the power plant 10 comprises a multi-stage air compressor assembly 12 having a first stage centrifugal impeller 14 and a second stage centrifugal impeller 16. The air compressor assembly 12 has an annular air inlet opening 18 registering with an annular opening 19 provided by a spinner member 20 rotatable with an aircraft propeller 22. The compressor assembly 12 is arranged to supply compressed air to a combustion chamber 24 from which the combustion

2 gases are directed against the rotor blades 26 of a turbine rotor 28. The turbine gases exhaust rearwardly through an exhaust duct 30 to provide the power plant with forward propulsive thrust. The turbine rotor 28 is drivably connected to the compressor assembly 12 by means of a shaft 32. In addition, the turbine rotor 28 is drivably connected to the aircraft propeller 22 through a suitable reduction gear 34. A casing 36 surrounds the compressor assembly 12, the combustion chamber 24, and the turbine structure of the power plant, said casing comprising a streamlined continuation of the propeller spinner 20. The structure so far described comprises a conventional turboprop power plant for aircraft.

A suitable radiator or heat exchange structure 38, for engine lubricating oil, is disposed in a duct 40 adjacent the forward end of the power plant 10. The forward end of the duct 40 communicates with the annular air entrance 19 through a passage 42 provided between the spinner member 20 and the adjacent casing structure 36 of the power plant. The rear or exit end of the duct 40 opens into the atmosphere surrounding the power plant casing 36. A flap valve 44 is hingedly supported at its forward or leading edge at the exit end of the duct 40 so as to control the discharge opening of said duct. With this structure, the flap valve 44 can be adjusted to regulate the rate of cooling air flow through the duct 44 and over its heat exchange structure 38 to control the temperature of the engine lubricating oil.

While the aircraft is on the ground, the quantity of air which the root ends of the propeller blades can supply to the duct 40 is not sufficient to provide adequate cooling of the lubricating oil flowing through the heat exchange structure 38 even when the flap valve 44 is in its fully open position. During flight, however, as a result of forward motion of the aircraft, sufficient cooling air flow can be obtained through the ducts 40 for cooling the oil. In flight therefore, the flap valve 44 may be adjusted between a minimum open position (Figure 2) and an intermediate open position (Figure 3) for controlling the rate of cooling air flow through the duct 40 and over its heat exchange structure 38. In order to augment the cooling air flow over the duct 40 during ground operation of the aircraft and its power plant 10, an ejector pump 46 is provided. The ejector pump 46 comprises a nozzle 48 disposed in the duct 40 downstream of the heat exchange structure 38 and directed in a downstream direction. A conduit 50, having a valve 52, connects the nozzle 48 with the compressor assembly, preferably intermediate the first and second stages of said assembly. With this arrangement, when the valve 52 is open, compressed air is bled off from an intermediate stage of the compressor assembly 12 and said air is discharged through the nozzle 48 to render the ejector pump 46 effective for drawing cooling air through the duct 40.

The cross-sectional area of the duct 40 required for adequate cooling air flow therethrough during aircraft flight is too large for efficient operation of the ejector pump. Accordingly, the cross-sectional area of the air flow path through said duct is reduced at the ejector pump nozzle when said pump is being used. For this purpose, a partition 54 extends across and longitudinally of the duct 40 to divide this portion of said duct into parallel passages 56 and 58. The nozzle 48 is disposed in the duct passage 56 and a flap valve 60 is hinged about the same axis as the flap valve 44 for opening or closing the passage 58. Also, as illustrated in Figure 5, where the duct passage 56 is relatively wide more than one nozzle 48 may be provided to increase the efficiency of the ejector pump arrangement.

In flight, the flap valve 44 is not moved to its wide open position because of the resulting excessive drag on the aircraft. Accordingly, the normal range of adjustment of the flap valve 44, in flight, is between its minimum open position of Figure 2 and its intermediate open position of Figure 3. During ground operation, however, the flap valve 44 may be opened beyond said normal range of adjustment to its wide open position of Figure 4. At the same time, the ejector pump valve 52 is opened so that compressed air is supplied to the ejector pump nozzle 48 thereby inducing a flow of cooling air over the heat exchange structure 38 and through the duct 40. The valve 60 is also closed at this time.

The duct flap valve 44, the passage valve 60, and the ejector pump valve 52 are preferably interconnected so that it is only necessary for the pilot to control the position of the duct flap valve 44. A suitable arrangement for this purpose is schematically illustrated in Figures 2, 3, and 4. As there illustrated, the duct flap valve 44 is movable by a rack 62 through a pinion 64 which in turn is drivably connected to a reversible electric motor 66 by means schematically indicated at 67. The motor 66 has a pair of windings 68 and 70 for reverse and forward operation. A double throw switch 72 is provided for connecting the motor 66 to one or the other of its windings 68 and 70 through a suitable source of electric energy 74 for moving the flap valve 44.

The flap valve 60, for the passage 58, is connected to a plunger 76 of a solenoid winding 78 for operation thereby. A spring 80 serves to hold the valve 60 in its normally open position. When the solenoid winding 78 is energized, the plunger 76 is drawn upwardly (as viewed in the drawing) to close the valve 60, and when the solenoid 78 is de-energized the spring 80 returns the valve 60 to its normal open position. The ejector pump valve 52 is connected to a plunger 82 of a solenoid winding 84 for operation thereby. A spring 86 normally holds the valve 52 in its closed position. When the solenoid winding 84 is energized, the plunger 82 is drawn upwardly (as viewed in the drawing) to open the valve 52. The solenoid windings 68 and 70 are connected in parallel to a suitable source of electric energy 88 and to a pair of contacts 90 and 92, the contact 90 being fixedly supported and the contact 92 being movable with the rack 62. The arrangement is such that the contacts 90 and 92 remain separated in all positions of adjustment of the duct flap valve 44 between its minimum open position of Figure 2 and its intermediate open position of Figure 3. However, when the duct flap valve 44 is adjusted to its maximum open position of Figure 4, the contacts 90 and 92 engage whereupon the solenoid windings 78 and 84 are energized. Upon energization of said windings, the passage 58 is closed by the valve 60 and the valve 52 is opened to render the ejector pump 46 effective to induce cooling air flow through the duct 40.

Obviously, other mechanism may be provided for interconnecting the valve 44, 52, and 60. For example, as illustrated in Figure 6, the duct flap valve 44 may be provided with an extension 45 which is arranged to pick or close the flap valve 60a when the valve 44 is moved from its intermediate position 44a to its wide open position 44b. A spring, not shown, may be provided for moving the valve 60a back to its open position when the duct flap valve 44 moves to its normal range of adjustment between its minimum open position and its intermediate open position. The valve 60a of Figure 6 corresponds to the valve 60 of Figures 1 to 4.

From the standpoint of compressor performance, the compressed air for the ejector pump is preferably bled-off at some intermediate stage of the compressor rather than at the discharge end of the compressor. Also, instead of the conventional centrifugal type compressor illustrated, other forms of compressors may be substituted therefor, as for example an axial flow compressor. In addition, although the invention has been illustrated and disclosed in connection with a turbo-prop power plant, it obviously is not so limited. For example, the invention is equally applicable to a turbo-jet power plant.

The invention has been described in connection with a cooling system for engine lubricating oil of an aircraft power plant. Obviously, however, the invention has other applications. For example, any fluid or liquid associated with an aircraft and requiring cooling during aircraft operation could be circulated through the radiator or heat exchange structure 38 so as to be cooled by the air flowing thereover.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A fluid cooling system for a vehicle; said system comprising a heat exchange structure through which said fluid is arranged to flow; a duct for said structure through which cooling air is arranged to flow over said structure at least in part as a result of forward motion of said vehicle; a partition longitudinally dividing said duct into a pair of parallel passages downstream of said structure, the upstream end of each of said passages being arranged to receive air flowing through said duct from said structure; an ejector pump for one of said passages; and a valve for controlling the other of said passages.

2. A fluid cooling system for a vehicle; said system comprising a heat exchange structure through which said fluid is arranged to flow; a duct for said structure through which cooling air is arranged to flow over said structure at least in part as a result of forward motion of said vehicle; a valve for controlling the flow of cooling air through said duct; a partition longitudinally dividing said duct into a pair of parallel passages downstream of said structure, the upstream end of each of said passages being arranged to receive air flowing through said duct from said structure; an ejector pump for one of said passages; and a valve for controlling the other of said passages.

3. A fluid cooling system for a vehicle; said system comprising a heat exchange structure through which said fluid is arranged to flow; a duct for said structure through which cooling air is arranged to flow over said structure at least in part as a result of forward motion of said vehicle, the discharge end of said duct opening into the surrounding atmosphere; a flap valve disposed at the discharge end of said duct for controlling the cooling air flow therethrough; a partition longitudinally dividing said duct into a pair of parallel passages downstream of said structure, the upstream end of each of said passages being arranged to receive air flowing through said duct from said structure; an ejector pump for one of said passages; means for automatically closing the other of said passages when said flap valve is opened beyond a predetermined position; and means for automatically rendering said ejector pump effective when said flap valve is opened beyond a predetermined position.

4. A fluid cooling system for a vehicle having a power plant including a compressor for supplying the power plant with air for combustion; said system comprising a heat exchange structure through which said fluid is arranged to flow; a duct for said structure and through which cooling air is arranged to flow over said structure at least in part as a result of forward motion of said vehicle; a valve for controlling the flow of cooling air through said duct; a partition longitudinally dividing said duct into a pair of parallel passages; an ejector pump arranged to bleed off compressed air from said compressor and to discharge said air into one of said passages for inducing flow of cooling air over said structure; a valve for controlling the flow of compressed air to said ejector pump; and a valve for controlling the other of said passages.

5. A fluid cooling system for a vehicle having a power plant including a multi-stage compressor for supplying the power plant with air for combustion; said system comprising a heat exchange structure through which said fluid is arranged to flow; a duct within which said structure is disposed and through which cooling air is arranged to flow over said structure at least in part as a result of forward motion of said vehicle, the discharge end of said duct opening into the surrounding atmosphere; a flap valve disposed at the discharge end of said duct for controlling the cooling air flow therethrough; a partition longitudinally dividing said duct into a pair of parallel passages downstream of said structure; an ejector pump arranged to bleed off compressed air from an intermediate stage of said compressor and to discharge said air in a downstream direction in one of said passages for inducing flow of cooling air therethrough; a valve for controlling the flow of compressed air to said ejector pump and a valve for controlling the other of said passages.

6. A fluid cooling system for a vehicle having a power plant including a multi-stage compressor disposed adjacent to the forward end of said power plant for supplying said power plant with air for combustion; said system comprising a heat exchange structure disposed adjacent to the forward end of said power plant and through which said fluid is arranged to flow; a duct within which said structure is disposed and through which cooling air is arranged to flow over said structure at least in part as a result of forward motion of said vehicle, the discharge end of said duct opening into the surrounding atmosphere; a flap valve disposed at the discharge end of said duct for controlling the cooling air flow therethrough; a partition longitudinally dividing said duct into a pair of parallel passages downstream of said structure; an ejector pump arranged to bleed off compressed air from an intermediate stage of said compressor and to discharge said air in a downstream direction in one of said passages for inducing flow of cooling air therethrough; a valve for controlling the flow of compressed air to said ejector pump; a valve for controlling the other of said passages; means for automatically opening said ejector pump valve and means for automatically closing said passage valve only when said duct valve is opened beyond a predetermined position.

7. A fluid cooling system for a vehicle; said system comprising a heat exchange structure through which said fluid is arranged to flow; a duct for said structure through which cooling air is arranged to flow over said structure at least in part as a result of forward motion of said vehicle; a valve for controlilng the flow of said cooling air through said duct; an ejector pump for inducing flow of said cooling air through said duct and over said structure; a valve movable for controlling the operation of said ejector pump; and means operatively connecting said duct valve with said ejector pump valve; said operative connection including means movable upon opening movement of the duct valve beyond a predetermined position for moving the ejector pump valve to a position in which the ejector pump is effective.

8. A fluid cooling system for a vehicle having a power plant including a compressor for supplying the power plant with compressed air for combustion; said system comprising a heat exchange structure through which said fluid is arranged to flow; a duct for said structure through which cooling air is arranged to flow over said structure at least in part as a result of forward motion of said vehicle; a valve for controlling the flow of said cooling air through said duct; an ejector pump arranged to bleed off air from said compressor and to discharge said air into said duct for inducing flow of said cooling air through said duct and over said structure; a valve for controlling the flow of compressed air to said ejector pump from said compressor whereby opening of said ejector pump valve renders said ejector pump effective; and means operatively connecting said duct valve with said ejector pump valve; said operative connection including means operable for opening the ejector pump valve only when the duct valve is opened beyond a predetermined position.

9. A fluid cooling system for a vehicle having a power plant including a compressor for supplying the power plant with compressed air for combustion; said system comprising a heat exchange structure through which said fluid is arranged to flow; a duct for said structure through which said cooling air is arranged to flow over said structure at least in part as a result of forward motion of said vehicle, the discharge end of said duct opening rearwardly into the surrounding atmosphere; a flap valve at the discharge end of said duct and arranged to swing outwardly into the surrounding atmosphere to increase the discharge opening of said duct; an ejector pump arranged to bleed off air from said compressor and to discharge said bleed air into said duct downstream of said structure for inducing flow of said cooling air through duct and over said structure; a valve for controlling the flow of compressed air from said compressor to said ejector pump whereby opening of said ejector pump valve renders the ejector pump effective; and means operatively connecting said flap valve with said ejector pump valve; said operative connection including means operable for opening the ejector pump valve only when the flap valve is opened beyond a predetermined position.

10. A fluid cooling system for a vehicle having a power plant including a compressor for supplying the power plant with compressed air for combustion; said system comprising a heat exchange structure through which said fluid is arranged to flow; a duct for said structure through which said cooling air is arranged to flow over said structure at least in part as a result of forward motion of said vehicle, the discharge end of said duct opening rearwardly into the surrounding atmosphere; a flap valve at the discharge end of said duct and arranged to swing outwardly into the surrounding atmosphere to increase the discharge opening of said duct; an ejector pump arranged to bleed off air from said compressor and to discharge said bleed air into said duct downstream of said structure for inducing flow of said cooling air through duct and over said structure; a valve for controlling the flow of compressed air to said ejector pump whereby opening of said ejector pump valve renders said ejector pump effective; and means operatively connected to said ejector pump valve and operable upon opening movement of said flap valve beyond a predetermined open position for opening said ejector pump valve.

JOSEPH H. LEGGETT.
FRANCIS C. MORRIS.

REFERENCES CITED

The following references are of record in the file of this patent:

UNITED STATES PATENTS

| Number | Name | Date |
|---|---|---|
| 1,995,667 | Cano | Mar. 26, 1935 |
| 2,017,525 | Brennan | Oct. 15, 1935 |
| 2,021,282 | Blanchard | Nov. 19, 1935 |
| 2,158,758 | Lintern | May 16, 1939 |
| 2,390,161 | Mercier | Dec. 4, 1945 |
| 2,408,265 | Miller | Sept. 24, 1946 |
| 2,487,842 | Whiteman et al. | Nov. 15, 1949 |